July 2, 1968     Q. H. WILLIAMS     3,390,619

COUNTER-STACKER APPARATUS

Filed Feb. 2, 1966     12 Sheets—Sheet 1

United States Patent Office 3,390,619
Patented July 2, 1968

3,390,619
COUNTER-STACKER APPARATUS
Quentin H. Williams, Dayton, Ohio, assignor to Albemarle Paper Company, Richmond, Va., a corporation of Virginia
Filed Feb. 2, 1966, Ser. No. 524,984
7 Claims. (Cl. 93—93)

ABSTRACT OF THE DISCLOSURE

An apparatus for separating, counting, and stacking flat articles, particularly flat bottom multiwall bags. A separator assembly supports and moves a plurality of articles arranged in shingle fashion. Means are provided to engage the article at the end of the line and to advance the endmost article ahead of the remainder of the articles. A conveyor counter assembly engages the advanced separate article and conveys the article away from the remainder of the articles on the separator assembly. Counting means are provided to determine the number of articles passing through the conveyor assembly. A stacker assembly having hopper means receives the articles from the counter conveyor assembly and stacks them in superimposed fashion. After a predetermined number of articles have been received in the hopper means support means in the bottom of the hopper is opened and the stacked articles are dropped onto a conveyor belt for movement to a packaging station.

This invention relates, in general, to an apparatus for separating, counting and stacking flat articles. More particularly, this invention relates to an apparatus for separating, counting and stacking flat bottom bags received from a bag bottoming machine.

Bag bottomer machines, as shown in U.S. Patent 8,570,047 and improvement Patents 2,641,167 and 2,712,275, are normally used to produce multi-ply paper bags having a flat pasted bottom. The completed bags are received from the bag bottoming machine in a shingled fashion by a moving conveyor belt. The bags are retained on the conveyor belt for a time sufficient for the adhesive to fully set. Heretofore, the bags have been removed from the end of the belt by hand, counted and stacked in bunches prior to packaging. Normally, the bags are accumulated in stacks of about twenty-five bags and banded and placed in boxes or bales by hand. The hand counting and stacking operation at the end of a normal bag bottoming conveyor usually requires four or more people in order to effectively count and stack the bags as they come off of the conveyor belt. The stacking and counting of the bags by hand is uneconomical and often results in miscounts and non-uniform packaging.

It is therefore an object of the present invention to provide an apparatus for separating, counting and stacking bags received from a conveyor belt.

Another object of the present invention is to provide an apparatus which will separate flattened multi-ply bags received from a conveyor belt in shingled fashion.

Still another object of the present invention is to provide an apparatus which can separate, count and stack multi-ply paper bags at a high rate of speed.

Still another object of the present invention is to provide an apparatus which will operate efficiently with a minimum of maintenance.

A further object of the present invention is to provide an apparatus for separating, counting and stacking multi-ply paper bags that will arrange the bags in a series of stacks with each stack containing a predetermined number of bags.

The foregoing, and other aims, objects and advantages of the invention as may appear hereinafter, are in general realized in an apparatus for separating, counting and stacking flat articles which appaartus includes a separator assembly. The separator assembly includes transport means adapted to suport and to move a plurality of the articles arranged in a line in shingled fashion. Separator means are provided which are adapted to engage the article at the end of the line and to advance the article ahead of the remainder of the articles. Drive means is provided for the transport and separator means. The apparatus includes a conveyor-counter assembly. The conveyor means is adapted to engage the article advanced by the separator means and to convey the article away at a speed sufficient to separate the article completely from the next adjacent article. Counting means is provided which has an element adapted to be actuated by the passage of each article through the conveyor means. Drive means is provided for the conveyor means. A stacker assembly is provided which includes a hopper means adapted to receive the articles individually from the conveyor-counter assembly and to stack the articles in superimposed fashion. Movable support means is provided at the bottom of the hopper means supporting the stack of articles. Means actuated by the counting means to open and close the support means to drop the stack of articles when a predetermined number have been accumulated is also provided.

More specifically, the apparatus of the present invention for separating, counting and stacking flat bottom bags includes a first endless belt conveyor mechanism adapted to move a plurality of flat bags stacked in shingled fashion. Power means is provided for the first conveyor mechanism. A reciprocating blade device is provided which is adapted to engage the endmost flat bag and to move it forwardly from the remainder of the flat bags. A hold-down assembly is mounted on the conveyor mechanism to grip those flat bags overlying the endmost flat bag. Power means for the reciprocating blade device is provided. A second endless belt conveyor mechanism is positioned adjacent the delivery end of the first conveyor to receive and convey individually the flat bags advanced by the blade device. A counting mechanism is provided which has a portion thereof positioned to be actuated by individual flat bags moving through the second conveyor. An accumulator bin is positioned adjacent the delivery end of the second conveyor to collect the flat articles into a superimposed stack. Door means is provided on the bottom of the bin adapted to be opened to drop the stack of flat bags. Opening means is provided for the door means which is actuated by a counter mechanism when a predetermined number of bags have been collected in the accumulator bin.

The foregoing and other objects, features and advantages of the present invention will be apparent from a consideration of the following specification taken in conjuntion with the accompanying drawings in which like reference characters designate the same or similar parts throughout the several views.

The exemplary counter-stacker apparatus of the present invention is depicted and described as applied to the separation, counting and stacking of pasted-end, flat bottom paper bags having at least one end folded over. However, it is to be understood that the apparatus as a whole, as well as the several parts thereof, may be utilized for the separating, counting and stacking of any flat article having a folded portion at end thereof. For example, the apparatus of the present invention is well adapted for separating, counting and stacking flat cardboard box blanks. Other applications of the apparatus of the present invention will be apparent to those skilled in the art.

Figure 1:
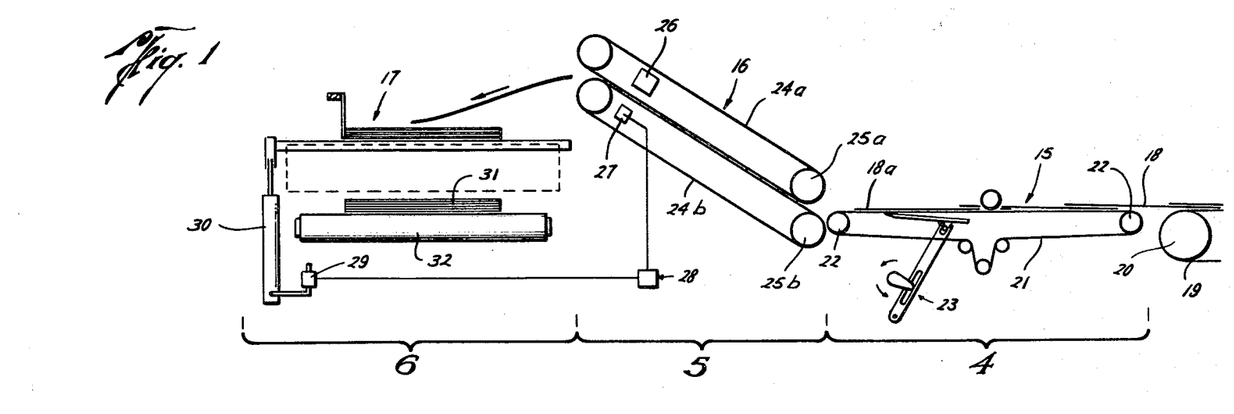
FIG. 1 is a side elevation of a schematic view of a counter-stacker apparatus constructed in accordance with the present invention.
Figure 2:
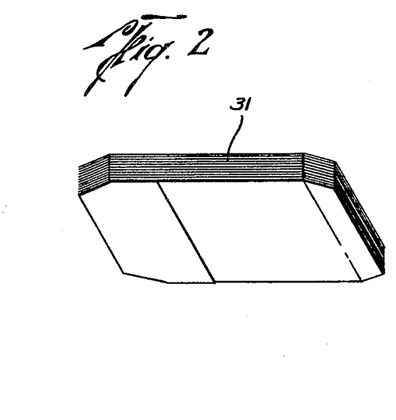
FIG. 2 is a perspective view of a stack of pasted end paper bags as delivered to the conveyor by the counter-stacker apparatus of the present invention.
Figure 3:
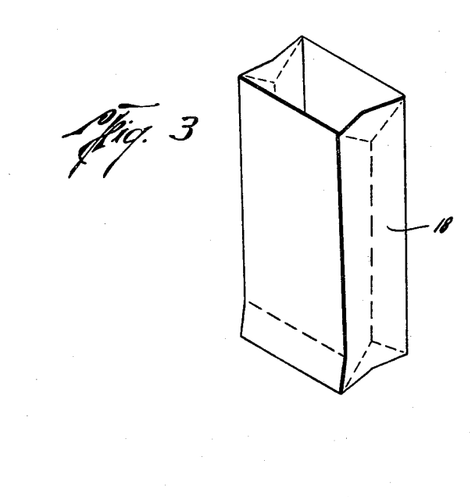
FIG. 3 is a perspective view of an exemplary pasted end multi-ply bag expanded to show its fold lines.

The counter-stacker apparatus of the present invention, in general, consists of three assemblies. Referring to FIG. 1, the bag-separator assembly, designated generally by the numeral 15, is that portion of the counter-stacker apparatus included within the bracket numbered 4 in FIG. 1. The conveyor-counter assembly, designated generally by the numeral 16, is that portion of the counter-stacker apparatus contained within the bracket labeled 5 in FIG. 1. The stacker assembly, designated generally by the numeral 17, is that portion of the apparatus of the present invention contained within the bracket labeled 6 in FIG. 1.

Referring still to FIG. 1, the bag-separator assembly 15 receives bags 18 from conveyor belt 19 which bags are longitudinally aligned, with respect to each other and to the direction of travel, and which are arranged in shingled fashion. The conveyor belt 19 passes over cylindrical roller 20. The bags 18 are received on an endless belt conveyor composed of a plurality of narrow flat belts 21 which pass over crowned flat rollers 22 at each end thereof. A reciprocating blade device, designated generally 23, engages the endmost bag 18a by means of the folded bottom in the leading end of the bag and moves it forwardly into the conveyor assembly 16. The conveyor-counter assembly includes a plurality of upper V-belts 24a and lower V-belts 24b carried on pulleys 25 at each end thereof. These belts move from right to left and are set to move at a higher speed than the corresponding belts 21 on the separator assembly. The endmost bag 18a is moved forward by the reciprocating blade device 23 and is received between belts 24a and belts 24b which carry the bag up the conveyor-counter assembly. A light source 26 is provided which normally impinges on a photoelectric cell receiver 27. The light beam is interrupted by each individual bag as it moves up the conveyor-counter assembly 16. The photoelectric cell actuates an electronic counter assembly, designated generally 28, which accumulates the counts of the individual bags moving up the conveyor-counter assembly 16. At the end of a predetermined number of counts, the electronic counter assembly 28 actuates a 4-way solenoid valve 29 which admits air to a hydraulic cylinder 30. The cylinder 30 operates a door mechanism, to be described more fully hereinafter, which dumps the stack of bags 31 that has been accumulated in the bin or hopper of the stacker assembly 17. A conveyor belt 32 carries the superimposed stacks of counted bags to the banding and packaging station.

BAG-SEPARATOR ASSEMBLY

Figures 4A, 4B:
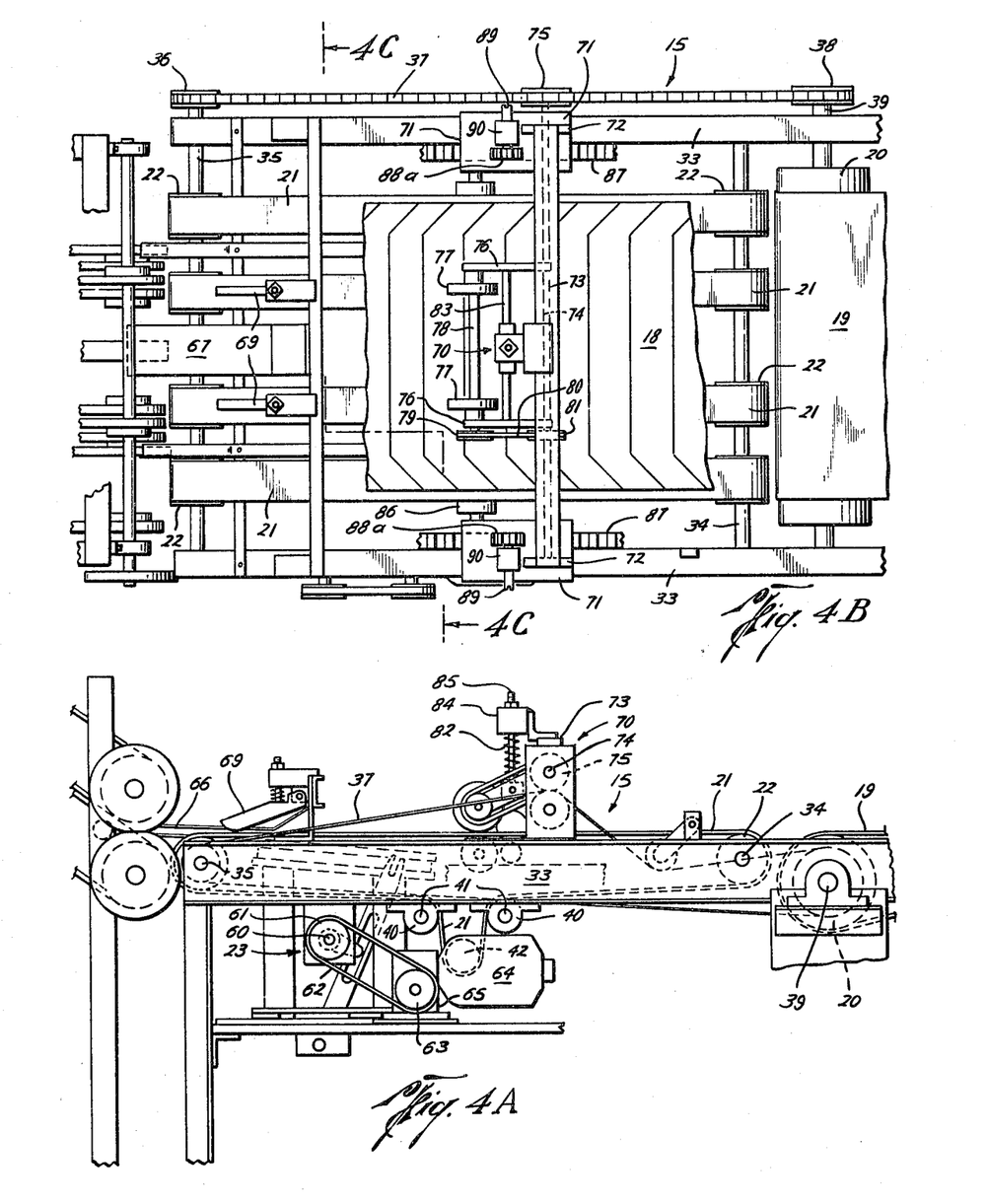
FIG. 4A is a side elevational view of the bag separator assembly of a counter-stacker apparatus constructed in accordance with the present invention.
FIG. 4B is a plan view of the apparatus of FIG. 4A.

Referring now to FIGS. 4A and 4B, the bag separator assembly includes a pair of spaced-apart support I-beams 33—33. A shaft 34 at the right hand end of the separator assembly is mounted between the pair of I-beams 33—33. A plurality of crowned flat rollers 22 are rotatably mounted on the shaft 34. Each roller 22 carries a narrow flat endles conveyor belt 21. At the left hand end of the bag separator assembly, the endless belts 21 pass over rollers 22 which are fixed to shaft 35 that is rotatably mounted between the I-beams 33—33. As seen in FIG. 4B, one end of shaft 35 projects through one I-beam 33 and has a sprocket wheel 36 mounted on the end thereof. A sprocket chain 37 connects the sprocket wheel 36 to a similar sprocket wheel 38 which is fixedly mounted on the end of shaft 39 that is keyed to and driven by the rotating cylinder 20 through the conveyor belt 19. Thus, the plurality of conveyor belts 21 in the bag-separator assembly are driven from the conveyor belt 19 at the same speed as conveyor belt 19. The bags 18 move across the conveyor belts 21 at the same speed they travel on the conveyor belt 19.

Figure 4C:
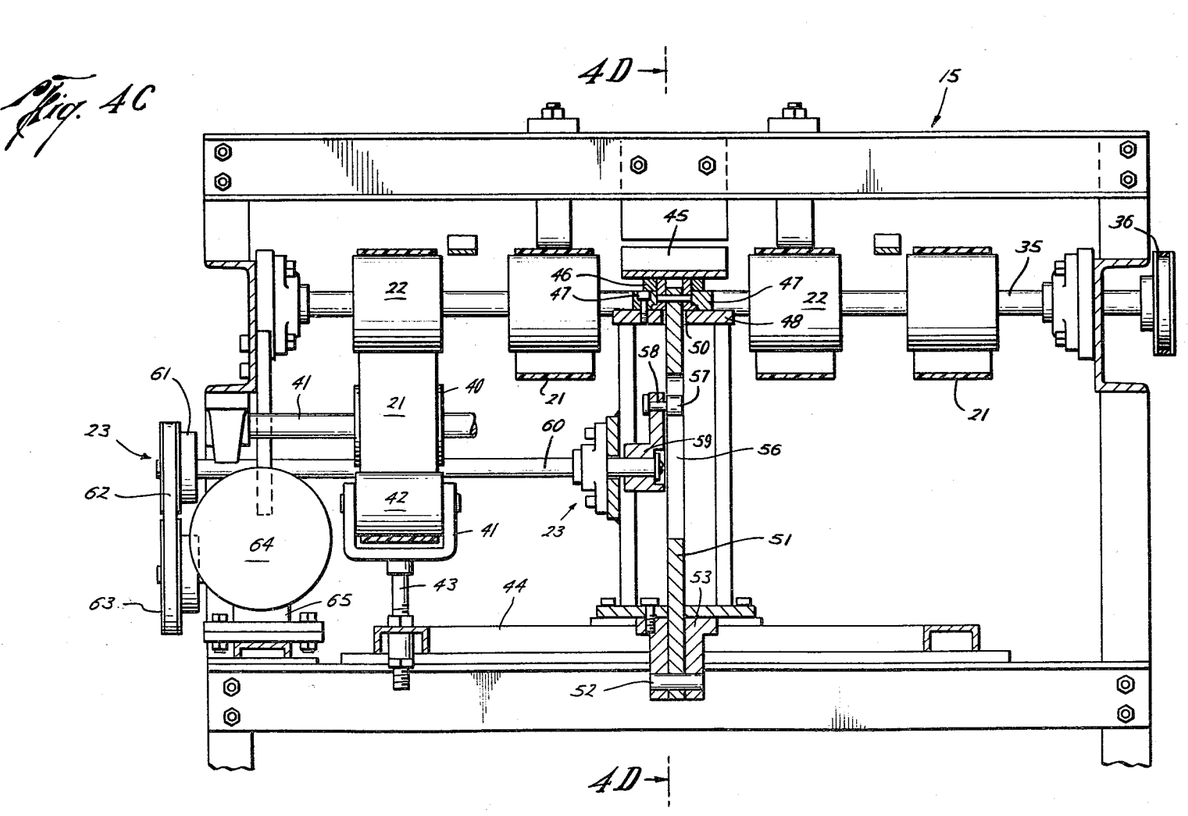
FIG. 4C is a cross-sectional view taken along the line 4C—4C of FIG. 4B.
Figure 4D:
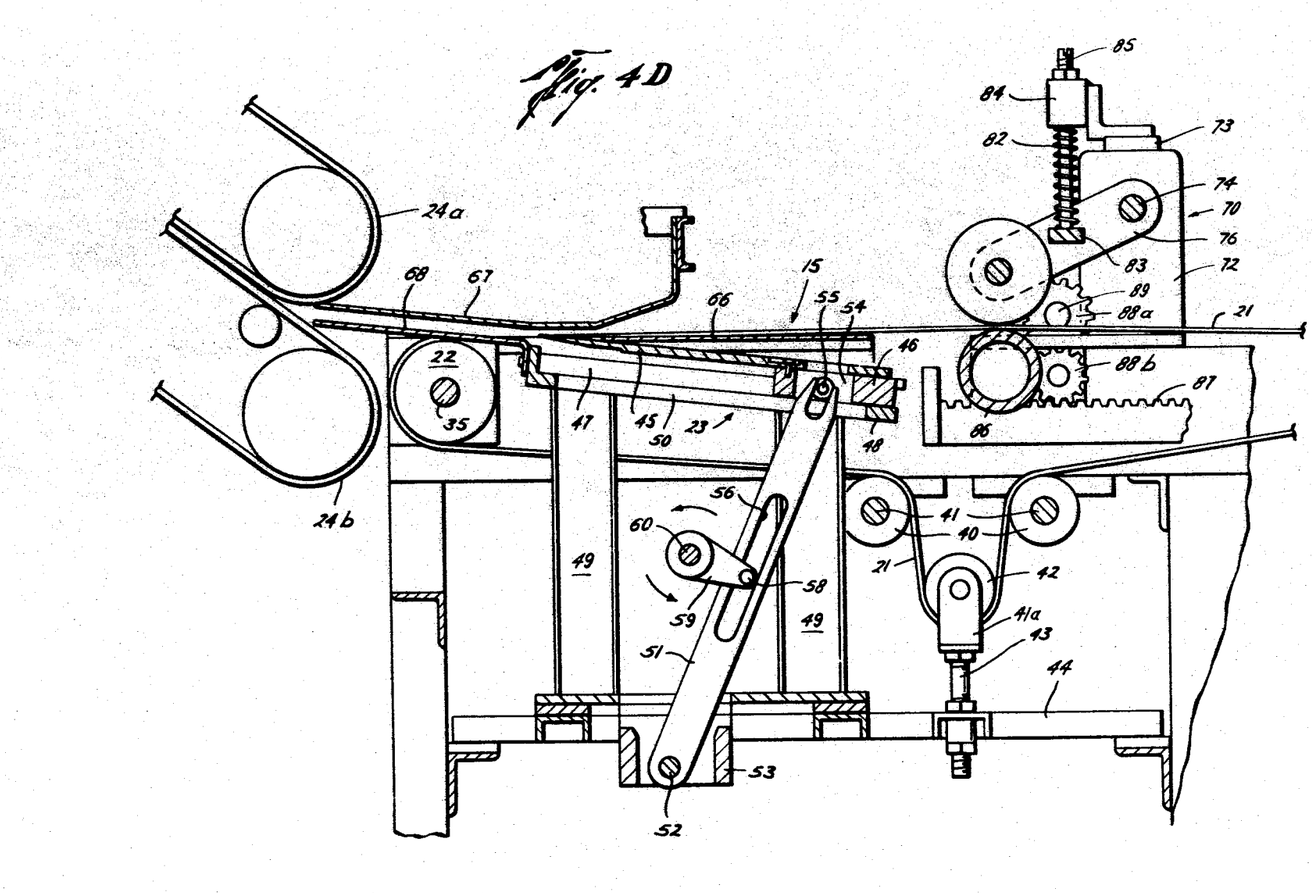
FIG. 4D is a longitudinal sectional view taken along the line 4D—4D of FIG. 4C.

As seen in FIGS. 4A and 4D, each narrow, flat conveyor belt 21 passes over a pair of spaced-apart rollers 40—40 rotatably mounted on spaced-apart shafts 41—41. A U-shaped bracket 41a carries adjustable roller 42 whereby the tension on each of the belts 21 may be adjusted. A threaded stud 43 attaches the bracket 41a and roller 42 to the channel member 44 and provides for adjustment for the height of roller 42.

Referring now to FIGS. 4A, 4C, 4D, 4E and 4F, the bag separator assembly includes a reciprocating blade device 23. A reciprocating blade 45 has one end mounted on a sliding block member 46 which is mounted between two spaced-apart guide members 47—47. The guide members are attached to a base plate 48 which is mounted at a slight angle to the plane of the conveyor belts 21 by means of spaced-apart support members 49—49. The base plate 48 is provided with a longitudinally extending slot 50 in the central portion thereof. The reciprocating blade 45 is driven through the sliding block member 46 by means of a driving arm 51. The lower end of the driving arm 51 pivots about shaft 52 which is mounted between spaced-apart brackets 53–53. The upper end of the driving arm 51 is bifurcated and projects through the slot 50 in the base plate. The upper end of the driving arm extends into a generally rectangular shaped opening 54 provided in the sliding block member 46. A shaft 55 extends across this opening 54 and is received in the bifurcated end of the driving shaft 51, thereby to provide a connection between the driving shaft 51 and the reciprocating blade 45. The driving arm 51 is provided with an elongated slot 56 in the central portion thereof. A rotatable sleeve 57 is carried on the end of a pin 58 which projects into the slot 56 in the driving arm. The pin 58 is carried by one end of a rotating arm 59 which is fixed to driving shaft 60. A pulley 61 is connected by means of V-belt 62 to a driving pulley 63. An electric motor 64 drives pulley 63 through reducer gear box 65.

Figure 4E:
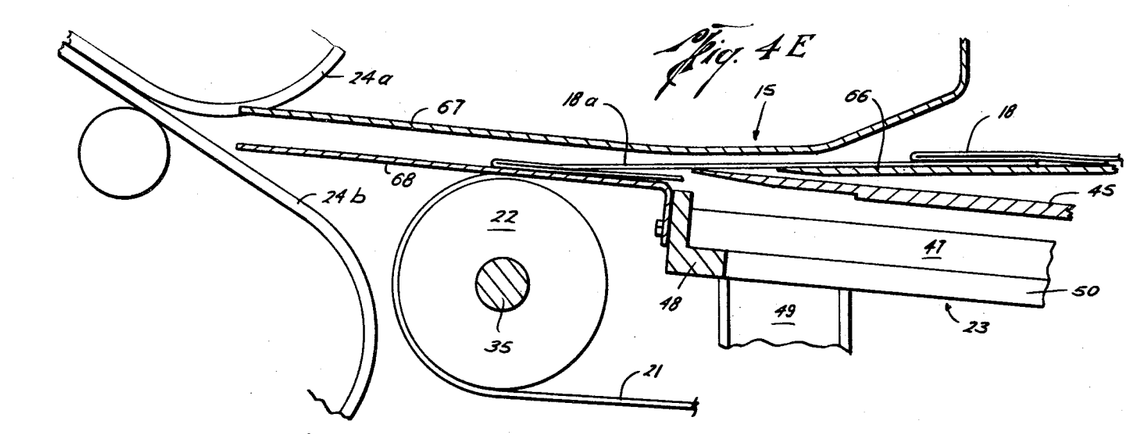
FIG. 4E is an enlarged sectional view of the end of the assembly shown in FIG. 4D with the separator blade in the retracted position.
Figure 4F:
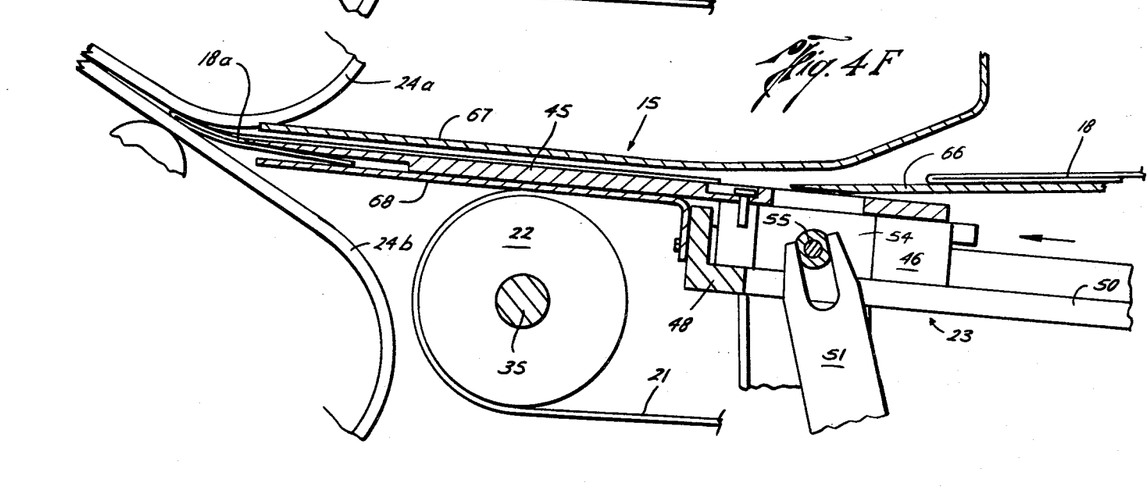
FIG. 4F is a view similar to FIG. 4E with the separator blade in the extended position.

Referring now particularly to FIGS. 4E and 4F, it can be seen that when the reciprocating blade 45 is in the retracted position (FIG. 4E), it is almost covered by top plate 66 over which the advancing bags 18 are moving. The conveyor belts 21 move the endmost bag 18a into the space between an upper deflector 67 and a lower deflector 68. The forward end of the reciprocating blade 45 then moves forward contacting the underside of the endmost bag 18a and slides into the slot provided by bottom wall and the folded down bottom portion of the bag. As the reciprocating blade continues its forward motion, the endmost bag 18a is rapidly pulled away from the other bags 18 overlying this end bag. As seen in FIG. 4F, the blade moves the end of the bag 18a into the nip between the upper V-belts 24a and the lower V-belts 24b.

The upper V-belts 24a and the lower V-belts 24b on the conveyor-counter assembly are moving at a speed sufficient to withdraw the endmost bag 18a from between the upper deflector plate 67 and the lower deflector plate 68 before the reciprocating blade 45 returns to its retracted position and begins its next forward motion to pick up a new bag. Referring now to FIGS. 4A and 4C, a pair of spaced-apart pressure fingers 69—69 are provided on either side of the upper deflector plate 67. These fingers press the endmost sack 18a down firmly against the top plate 66 to insure that the end of the reciprocating blade 45 can readily engage the folded end of the bag and move the bag rapidly into engagement with the conveyor belts 24a–24b.

Referring now to FIGS. 4A, 4B and 4D, the bag-separator assembly includes a hold-down device designated generally by the numeral 70. The hold-down device 70 includes a sliding support blade 71, as seen in FIG. 4B, positioned on top of each of the I-beams 33. A vertical member 72 extends upwardly from each of the support plates 71. A cross member 73 is fixedly connected between each of the support members 72—72. A rotatable shaft 74 extends between the vertical members 72—72. One end of the shaft 74 extends through one vertical member 72 and has affixed thereto a sprocket wheel 75 which engages and is driven by sprocket chain 37. A pair of spaced-apart support arms 76—76 are movably mounted on shaft 74. A pair of spaced-apart wheels 77—77 are fixedly mounted on a rotatable shaft 78 carried by the spaced-apart support members 76—76. One end of the shaft 78 has affixed thereto a pulley 79 which carries a V-belt 80 that is connected to a pulley 81 fixedly mounted on shaft 74 and rotated thereby. The pressure of the wheels 77—77 on the bags 18 is controlled by a spring 82 which extends between cross support 83 and a collar 84 which is mounted on the cross member 73. A threaded stud 85 is affixed to the cross member 83 and extends freely through a hole provided in the collar 84. The spring 82 surrounds the stud 85. A support roller 86 is mounted between the I-beams 33—33 directly beneath the pressure wheels 77—77. Thus, the pressure wheels 77—77 and roller 86 provide a means for tightly gripping the shingled bags as they pass through on the conveyor belts 21.

The purpose of the hold-down device is to prevent those bags which overlie the endmost bag 18a from being moved forward when the reciprocating blade 45 picks up the endmost bag and moves it into engagement with the V-belts 24a and 24b of the conveyor-counter assembly. In order to make the hold-down device adjustable to compensate for different length bags which are commonly run on most standard bottomer machines, a rack and pinion assembly is provided to position the hold-down device longitudinally on the bag separator assembly. A toothed rack 87 is affixed to the inside of each of the I-beams 33—33. A first pinion gear 88a is mounted on a shaft 89 journaled in a block 90 which is fixedly attached to the support plate 71 on each side of the assembly. A second pinion gear 88b connects the first pinion gear 88a to the rack 87. By rotating each of the shafts 89—89, the hold-down device can be moved longitudinally of the separator assembly and fixedly positioned in order to properly grip all bags overlying the endmost bag regardless of the length of the bags being processed.

CONVEYOR-COUNTER ASSEMBLY

Figure 5A:
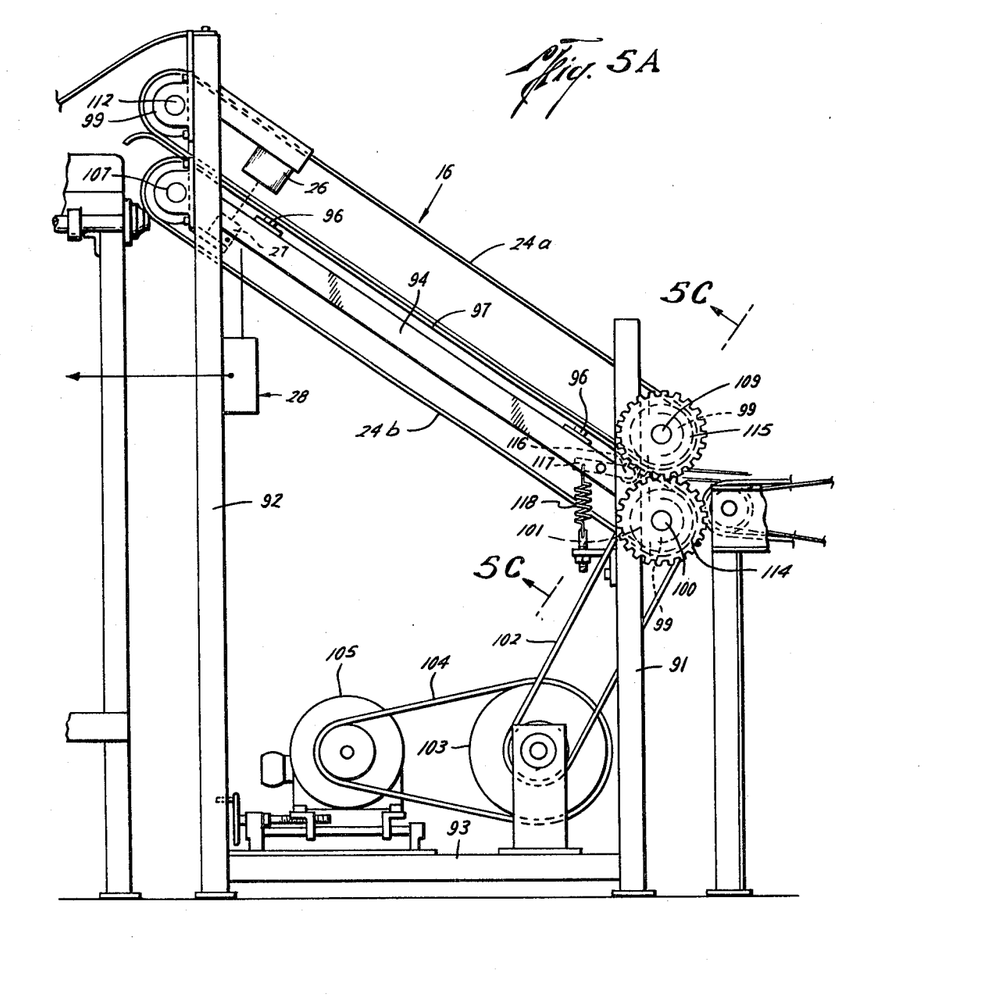
FIG. 5A is a side elevation view of the conveyor-counter assembly of a counter-stacker apparatus constructed in accordance with the present invention.
Figure 5B:
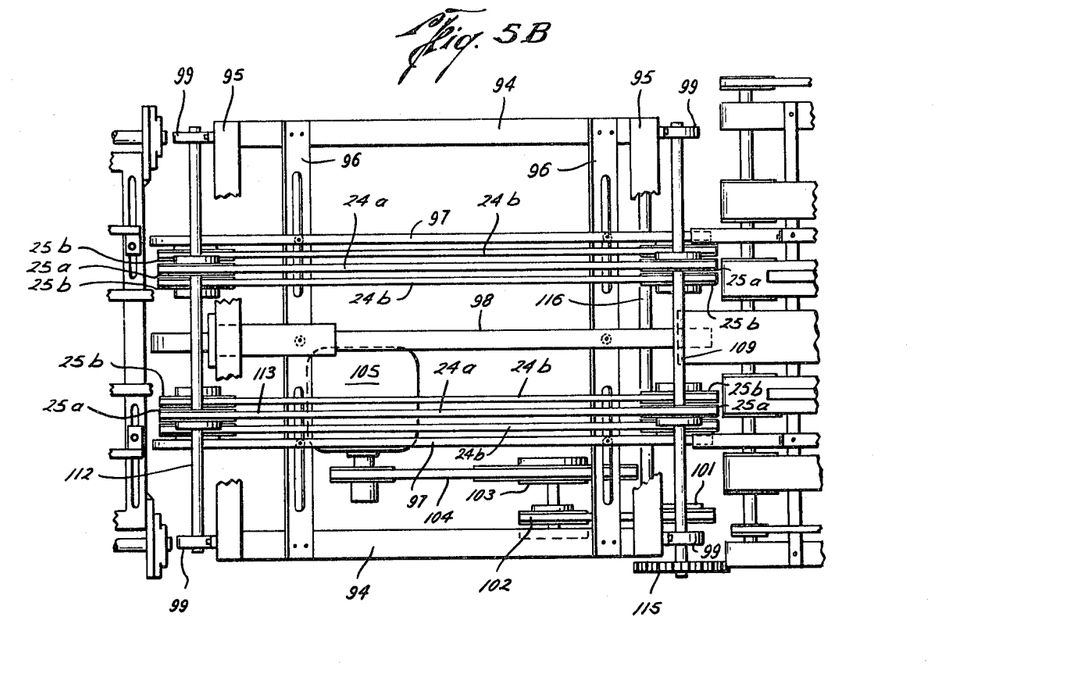
FIG. 5B is a plan view of the apparatus of FIG. 5A.
Figure 5C:
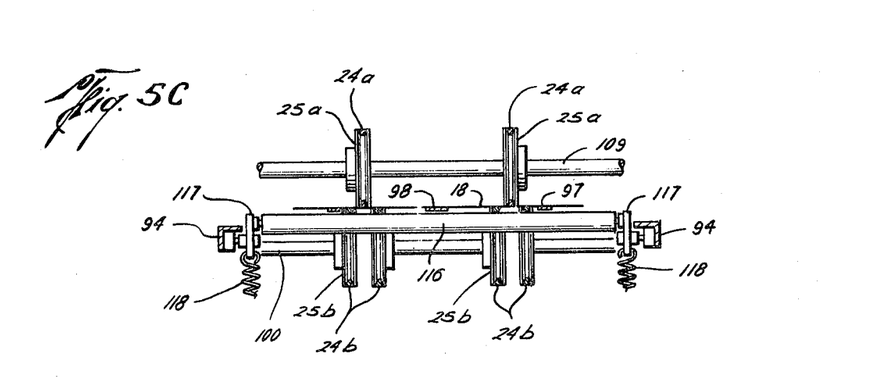
FIG. 5C is a cross-sectional view taken along the line 5C—5C of FIG. 5A.

Referring now to FIGS. 5A, 5B and 5C, the conveyor-counter assembly is mounted on a generally rectangular frame which includes short forward legs 91 and tall rearward legs 92 (only one of each can be seen in FIG. 5A). A cross brace 93 is provided near the bottom of the legs. An upper side brace 94, having a flat upper surface, is mounted on an angle and joins the forward and rearward legs adjacent their top ends. An upper end brace 95 extends between the pair of forward legs 91—91, and also between the pair of rearward legs 92—92. A slotted cross member 96 extends between the upper side braces 94—94 adjacent each one of the upper end braces 95. A pair of spaced-apart support straps 97—97 extends longitudinally between the cross members 96—96 and are mounted to be adjustable utilizing the slots provided in the cross members 96. A center support strap 98 is fixedly positioned between the slotted cross members 96—96. These support straps provide the surface over which the individual bags are moved up the conveyor.

A lower bearing block 99 is mounted on each of the forward legs 91. A rotatable shaft 100 is received in these bearing blocks 99. The shaft 100 has a pulley 101 affixed inboard of one end thereof which is driven by belt 102 connected to speed reducer pulley 103, which is in turn connected by belt 104 to the electric motor 105. Two sets of double, spaced-apart V-belt pulleys 25b—25b, 25b—25b are fixedly mounted on shaft 100, one set being mounted on either side of the center support strap 98 as may be seen more clearly in FIG. 5B. An upper set of bearing blocks 99—99 is mounted adjacent the upper end of the upper side braces 94—94 on each of the rearward legs 92. A shaft 107 extends between the two bearing blocks. Two sets of double, spaced-apart V-belt pulleys 25b—25b, and 25b—25b are rotatably mounted on shaft 107 in identical positions to the pulleys mounted on shaft 100. An endless lower V-belt 24b extends between opposite longitudinally aligned pulleys 25b—25b carried by shafts 100 and 107. An upper bearing block 99 is mounted on each of the forward legs 91 and carries therebetween a rotatable shaft 109. Shaft 109 has mounted thereon on upper V-belt pulley 25a positioned between each pair of lower V-belt pulleys 25b—25b. The pulleys 25a—25a are attached to the shaft 109 to rotate therewith. An upper bearing block 99 is also mounted on each one of the upper ends of the rearward legs 92—92 and carries therebetween a rotating shaft 112. Two upper V-belt pulleys 25a, 25a are attached to this shaft and carry endless V-belt 24a positioned between the belts 24b—24b on the lower shaft 107.

Each pair of upper and lower shafts at each end of the conveyor-counter assembly is spaced apart so that the upper faces of the lower belts 24b and the upper belts 24a pass approximately through the same plane. As can be seen in FIG. 5C, the bag 18 advanced by the reciprocating blade is pressed between the pairs of lower belts 24b—24b and the upper belt 24a. The lower belts 24b—24b press against the lower surface of the bag while the upper belts 24a press down against the upper surface of the bag.

Referring to FIGS. 5A and 5B, lower gear 114 is fixed to driving shaft 100 and engages the upper gear 115 which in turn drives shaft 109. Thus, the portion of the upper belts 24a and lower belts 24b which contact the bag top and bottom surfaces are moving in a direction from the lower end of the conveyor-counter assembly to the upper end thereof, i.e., from right to left in FIG. 5A. As can be seen in FIG. 5C, a bag 18 is gripped firmly between the belts 24a and 24b and carried rapidly up the conveyor counter. The speed of motor 105 is adjusted so that the bags 18 are received individually from the reciprocating blade and transported up the conveyor with an open space between adjacent bags. As each bag moves through the assembly, it interrupts the light originating at the light source 26 and impinging on the opposite photoelectric cell 27. When each individual bag breaks the light path between the light source and the photoelectric cell, the counter device 28 is actuated and accumulates the individual counts as each bag passes through the light beam.

As can be seen in FIGS. 5A and 5C, a pressure roller 116 is supported between two arms 117—117 which are pivotally mounted to upper side braces 94—94. Springs 118 maintain the pressure roller in firm contact with the lower endless V-belts 24b. Purpose of the pressure roller 116 is to force the lower belts 24b into firm contact with the underside of the bag 18 to insure that the bag is firmly gripped between upper belts 24a and lower belts 24b when the reciprocating blade causes the single bag to first contact the belts. As mentioned hereinbefore, the speed of the rotating upper belts 24a and lower belts 24b is so adjusted to transport one bag up the conveyor before the next bag is introduced into the receiving end of the conveyor so that there is a finite space between each individual bag traveling up the conveyor.

Figure 7:
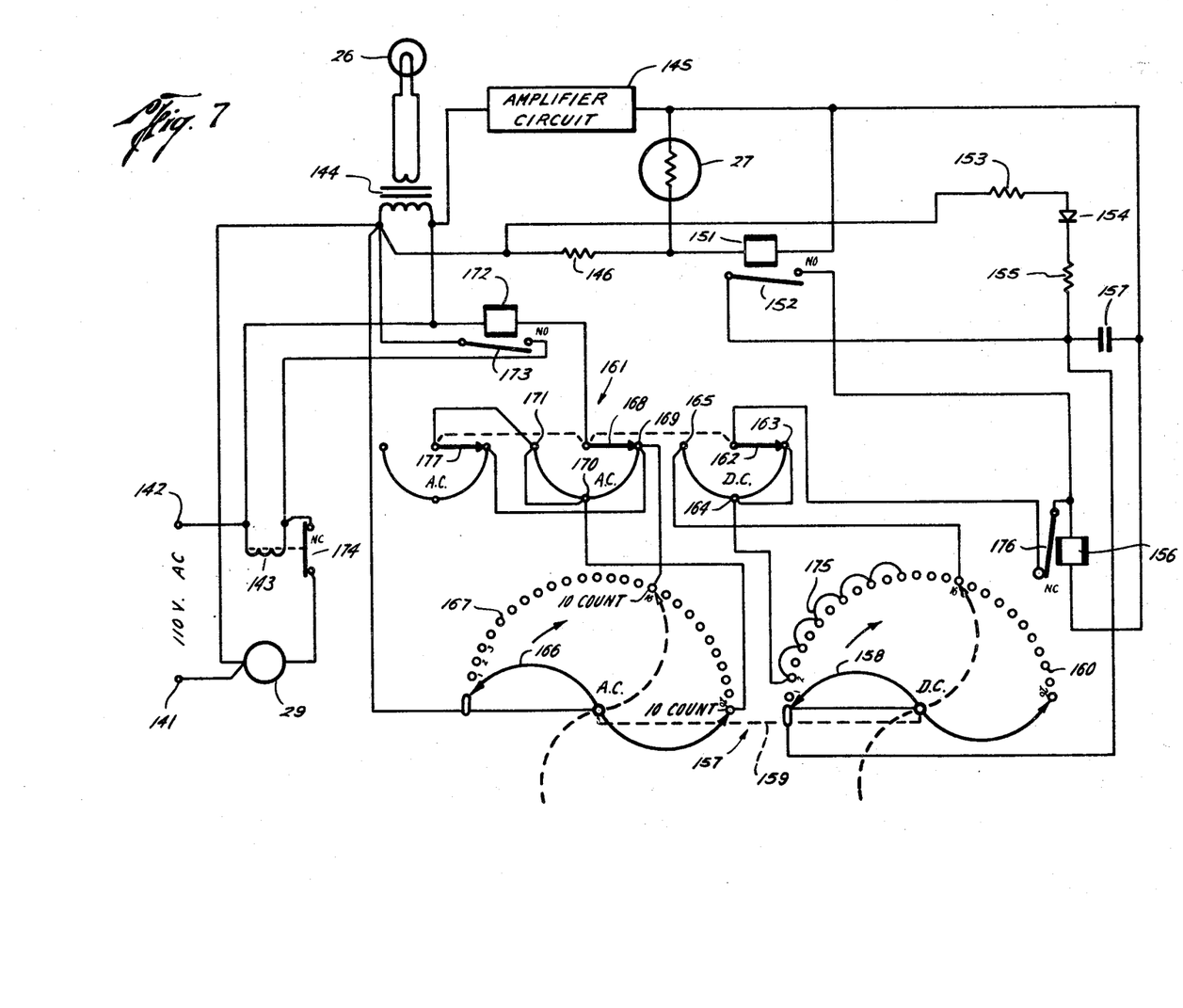
FIG. 7 is a schematic diagram of a photoelectric counter mechanism suitable for use in the counter-stacker apparatus of the present invention.

Referring now to FIG. 7, the wiring diagram for the electronic-counter assembly 28 is depicted. The electronic-counter assembly shown in this figure is designed to count the bags as they are placed in the stacker assembly 17 and then to actuate the solenoid valve 29 when the stacker assembly has accumulated either ten, twenty, or twenty-five bags in a stack. One of the 110 volt lead wires 141 is connected to one side of 4-way solenoid valve 29. The other 110 volt lead wire 142 is connected to one side of the coil of time delay relay 143 and is also connected to one side of step-down transformer 144. The transformer 144 provides the power for the five volt light source 26. One lead of the photoelectric cell 27 (which can be an 8143 or 8347 photo tube) is connected to the 110 volt lead 142 through amplifier circuit 145.

The other lead of the photo tube is connected to 110 volt lead 141 through a 22 ohm voltage dropping resistor 146. The amplifier circuit can be any conventional amplifier circuit which will close the circuit through lead 142 when the photocell 27 is energized. When the light from light source 26 strikes the photocell 27, relay coil 151 is normally energized and holds normally open switch 153 in the closed position. A one watt 5.6 ohm resistor 153, a 200 milliamp rectifier 154 and a 500 ohm 10 watt resistor 155 provides the D.C. current for the coil 156 on the D.C. stepping switch, designated generally 157. A 20 microfarad condenser 147 is connected across the D.C. leads to coil 156. The stepping switch coil 156 through its armature and ratchet and pawl device (not shown) actuates a rotatable switch contacter arm 158 which is mounted on rotating shaft 159. The arm 158 is adapted to make contact individually with a plurality of contacter points 160 arranged around the periphery of the stepping switch. One deck of the selector switch, designated generally by the numeral 161, has a contactor arm 162 adapted to make contact with fixed point 163 which is set for a count of 10 bags, point 164 which is set for a count of 20 bags, and point 165 which is set for a count of 25 bags. These contact points are connected by appropriate wires to the proper positions on the contact points 160 on the stepping switch 157. The stepping switch 157 has a second deck (the A.C. deck) which includes contacter arm 166 attached to shaft 159 which makes contact with fixed contact points 167 mounted on the second deck of the switch. The second deck of selector switch 161 has a contacter arm 168 adapted to contact fixed contact 169 which sets a count of 10 bags, or contact point 170 which sets a count of 20 bags, or contact point 171 which sets a count of 25 bags. When the A.C. circuit is completed through contacter arm 166, fixed contacts 167 and the appropriate contacts on the second deck of selector switch 161, the 110 volt relay coil 172 is energized closing switch 173 which applies 110 volts to the coil 143 on the time delay relay and thus opens switch 174, thereby shifting the plunger in solenoid 29 to change the position of air flow into cylinder 30. After a delay period switch 174 closes and the solenoid returns to its original position.

Referring now to FIG. 7, the operation of the counter mechanism will be explained when the selector switch 161 is set for the ten count position as shown in FIG. 7. When the photoelectric cell-amplifier circuit is energized, relay coil 151 will pull contacts on switch 152 together thus applying D.C. voltage (from the rectifier described hereinbefore) to the stepping switch coil 156. The stepping switch coil will act through its armature and pawl and ratchet device (not shown) to move the D.C. contact arm 158 and the A.C. contact arm 166, which are jointly mounted on a single shaft 159, one step from the "home" position to contact No. 1 on both decks of fixed contact points 160 and 167. It should be noted that contact arms 158 and 166 extend equidistantly to either side of shaft 159, and rotate clockwise. Thus, when the left end of each arm moves to the first fixed contact point the right end leaves the contact sector and thus this gives in effect full 360° operation of the stepping switch.

As the second bag passes through the photoelectric counter, coil 151 is energized again and contacts 152 close which energizes the stepping switch coil 156 and thus moves contact arms 158 and 166 one more step to contact No. 2.

Turning now to the D.C. sector switch, it will be noted that each deck of switch 157 contains 26 fixed contacts, in addition to the "home" of the starting contact. In order to count ten or twenty bags, six of these contacts must be bypassed or otherwise made ineffective in the total count of ten or twenty, and one contact must be bypassed for a count of twenty-five. The bypassing is done in the ten and twenty count positions by connecting jumper wire 175 to six alternate contacts starting with contact No. 2 (connecting contact 2, 4, 6, 8, 10 and 12) and then to the ten count contact 163 and to the twenty count contact 164 on selector switch 161. With the contact arm 162 of selector switch 161 set for a ten count at contact 163, and with the stepping switch contact arm 158 on fixed contact No. 2, a circuit is completed through the interrupter contact 176 (which close when coil 156 is deenergized after passage of a bag through the photoelectric cell light beam) to again energize coil 156 and thus to step arm 158 onto contact point No. 3 where it will remain until the next bag passes through the counting device. This double stepping action is repeated for the next five bags after which the next three bags will move contact arm 158 only one step for each of a total of ten bags. When contact arm 158 has reached this point, which is actually contact point No. 16 on the drawing, contact arm 166 on the A.C. deck of stepping switch 157 has also reached contact point No. 16, since it is mounted on common shaft 159. The circuit is thus completed to contact arm 166 to selector contact 169 and the arm 168 which energizes coil 172, thus closing contacts 173 which applies voltage to the time delay relay coil 143. Switch contacts 174 remain closed for a preset interval to allow voltage to energize the air valve solenoid 29. When the solenoid valve 29 opens air will be supplied to the hydraulic cylinder 30 which opens hopper doors 123 dropping ten bags onto the conveyor 32. At this point, the time delay relay contacts 174 will open, deenergizing solenoid valve 29 to reverse the cylinder arm 127 which closes hopper doors 123 in preparation for the next ten bags. The first of the next ten bags to be counted will move contact arm 166 to contact No. 17 and thus break the circuit to coil 172. This will open the contacts 173 and allow time delay relay contact 174 to close to its normal position. Thus relay contact 174 is reset for the next bag dropping operation. Since there are now only ten remaining contacts in the path of stepping switch arms 158 and 166, the next ten bags will move contact arm 166 to contact No. 26, thus completing the circuit to selector contact 170 and via jumper to contact 171 in contacter arm 177 and thus on the contact 169 and contact arm 168 which will energize coil 172 for a repeat of the bag dropping sequence.

Figure 8:
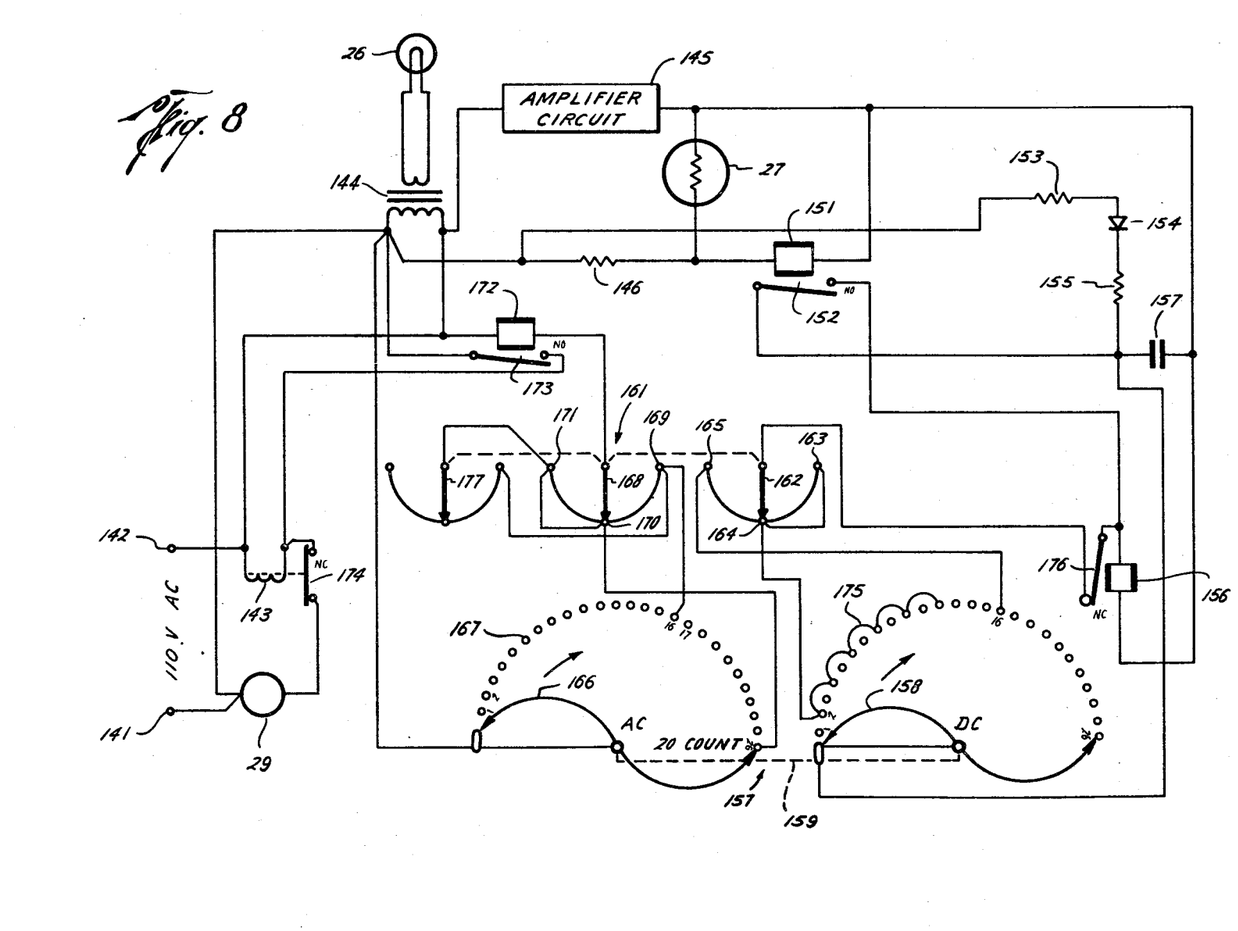
FIG. 8 is a schematic diagram similar to FIG. 7 showing the counter set for 20 bags.

Referring now to FIG. 8, the operation of the counting mechanism will be described when the selector switch 161 is set in the twenty count position as shown in the drawing. The actual counting operation of the D.C. sector, i.e., arm 158 of the selector stepping switch 157, is exactly the same for the ten count previously described. As can be seen, contact arm 162 of selector switch 161 is positioned on contact 164 which is connected by a jumper wire to the ten count contact 163, thus providing identical operation to that experienced when the D.C. arm is set on a count of ten.

However, the operation of the A.C. sector switch, i.e., arm 166, is different. With selector switch arm 168 in the twenty count position on contact 170, stepping switch arm 166 will advance all the way to contact No. 26 before completing the circuit to energize coil 172, thus allowing an accumulation of twenty bags in the hopper before dropping them on the conveyor 32. It should be noted that contacter arm 177 of the selector switch 161 is positioned on a contact which has no connection with the rest of the circuit, thus this deck of the switch is inactive in a twenty count position.

Figure 9:
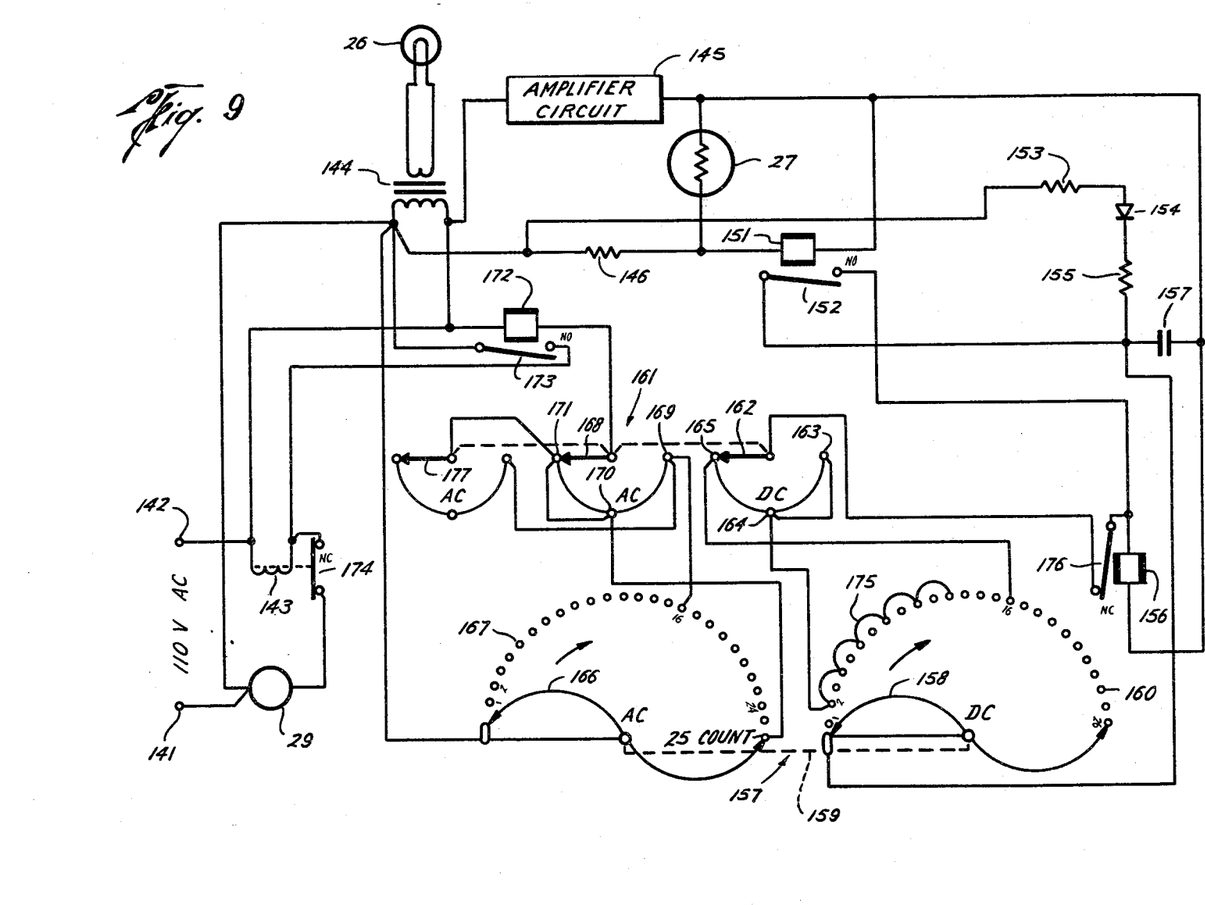
FIG. 9 is a schematic diagram similar to FIG. 7 showing the counter set for 25 bags.

Referring now to FIG. 9, the operation of the counting circuit with the selector switch 161 set for a count of twenty-five bags will be described. The D.C. stepping switch contact arm 158 will advance only one contact point per bag up to and including contact point No. 15, since jumper wires 175 are no longer effective with the selector switch arm 162 on contact 165. However, when stepping switch arm 158 reaches contact No. 16, a circuit is completed through selector switch contact 165, arm 162, and interrupter contacts 176 to energize the stepping switch coil 156 and thus advance stepping switch arm 158 to contact point No. 17. Thus, this operation provides two steps for this one bag and provides a total effective count of twenty-five while moving the switch arm 158 through a total of twenty-six contacts. When A.C. stepping switch arm 166 reaches contact point No. 26 (after twenty-five bags), a circuit is completed through selector switch contact 170, jumper to contact 171, and contact arm 168, thus energizing coil 172 for another bag dropping sequence of twenty-five bags. Selector switch arm 177 is again on a contact having no connection to the circuit and serves no function for the twenty-five count operation.

While a photoelectric circuit has been shown as the energizing circuit for applying the voltage to coil 151, any other suitable energizing device may be used, for instance, a microswitch can be used to energize this coil, or a magnetic switch, or an air jet, any of which would be actuated by the bags passing through the conveyor mechanism.

While the photoelectric counter described hereinbefore is admirably suited for use with the counter-stacker apparatus of the present invention, the apparatus is not limited to the use of the hereinbefore described counter. Other off-the-shelf counting mechanisms may be used with the counter-stacker apparatus of the present invention, for example, precision Products and Controls, Inc. "Cyclo-Master" Model "Precon 8" may be used. This counter is an electromechanical-type counter. Also an electromagnetic-type counter such as the "SODECO" type TCeF–4 PE can be used for counting the bags. Additionally, the "Microflex" reset counter may be used for counting the bags. All of the foregoing type counters are predetermining type, i.e., they can be set from 1 to as high as 400 or more impulses after which they will electrically actuate any mechanism, viz. the 4-way solenoid valve 29 of the present apparatus, and then the devices will reset and recount the predetermined number of articles.

STACKER ASSEMBLY

The stacker assembly, designated 17 generally, is shown in an exemplary form in FIGS. 6A, 6B, 6C and 6D. The stacker assembly includes a pair of spaced-apart forward support legs 119—119 (only one of which can be seen in FIG. 6A). A pair of spaced-apart rearward support legs 120—120 is also provided. A rectangular support from 121 is mounted on top of the forward and rearward support legs. A pair of adjustable sideboards 122—122 are mounted on the rectangular support frame 121. The opening in the lower portion of the rectangular support 121 is partially closed by a pair of swinging doors 123—123. Each door is carried on arms 124. One door is attached by arms 124 to a longitudinally extending rotatable right hand shaft 125a and the other door to left hand shaft 125b. The shafts are positioned on opposite sides of the stacker assembly.

Figure 6A:
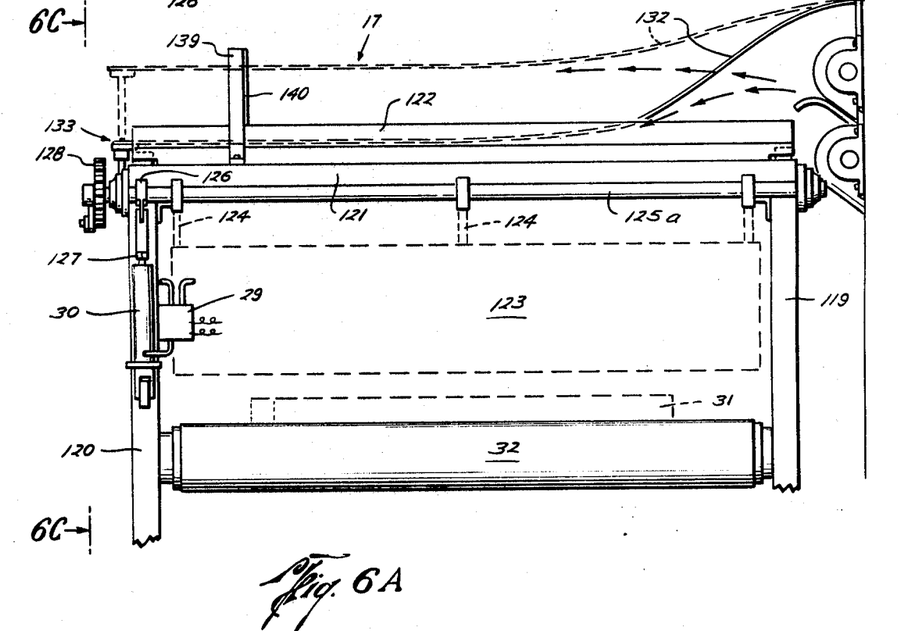
FIG. 6A is a side elevational view of the stacker assembly of a counter-stacker apparatus constructed in accordance with the present invention.
Figure 6B:
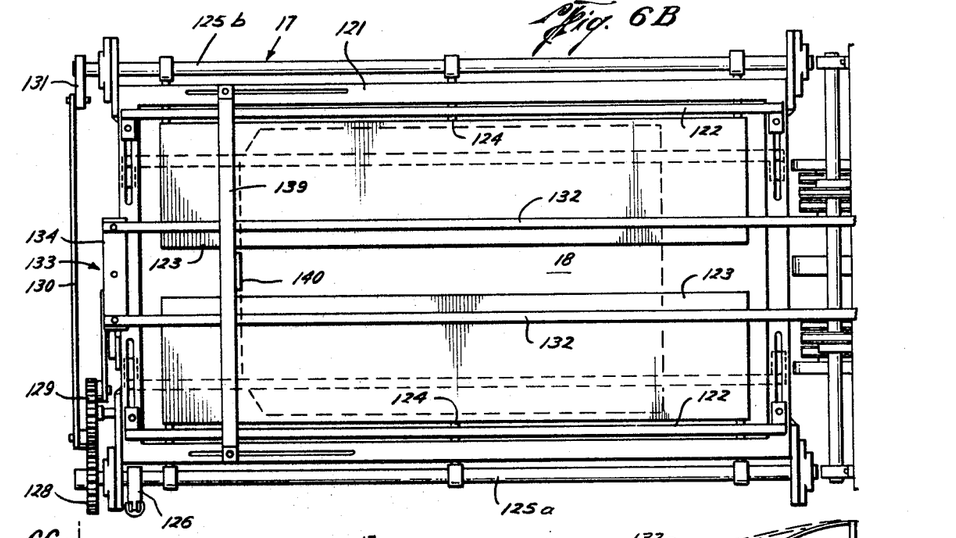
FIG. 6B is a plan view of the apparatus of FIG. 6A.

As seen more clearly in FIGS. 6A and 6B, right hand shaft 125a has attached adjacent the left hand end thereof a fixed arm 126 which is in turn attached to piston rod 127 of hydraulic cylinder 30. The end of shaft 125a adjacent the cylinder 30 has fixed thereon a gear 128. This gear meshes with a like gear 129 which is mounted on the rectangular frame. A linking rod 130 has one end attached to the outer periphery of gear 129 and extends across to arm 131 which is fixedly attached to the left hand end of shaft 125b.

Figure 6C:
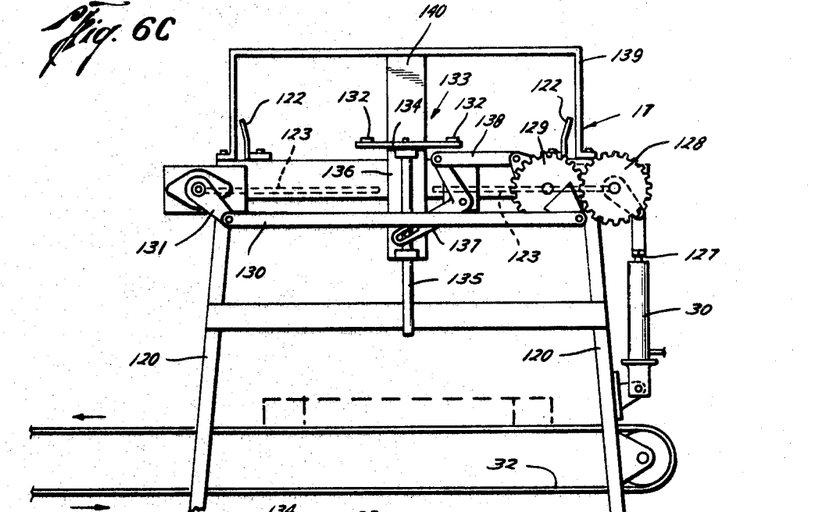
FIG. 6C is an end view of the stacker assembly of FIG. 6A with the doors in the closed position.
Figure 6D:
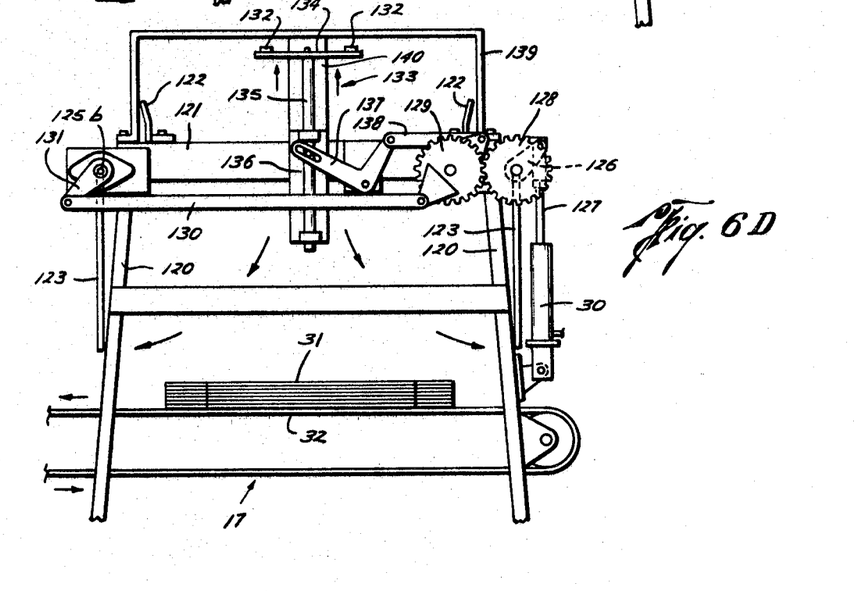
FIG. 6D is a view similar to FIG. 6C showing the doors in the open position.

Solenoid valve 29 is a four-way valve which can apply air pressure to either the upper portion of cylinder 30 or the lower portion thereof, depending upon the signal given to the valve 29. The valve automatically vents the air from the portion of the cylinder toward which the piston is being moved. When a predetermined number of bags 18 have been collected within the hopper or bin defined by the rectangular frame 121 and the doors 123—123, the electronic counter assembly 28 actuates the solenoid valve 29. As seen in FIGS. 6A, 6B and 6C the piston rod 127 is retracted within the cylinder 30 when the doors 123 are in the closed position as the individual bags 18 are being accumulated in the bin of the stacker assembly. Air pressure is applied to upper portion of cylinder 30 to hold the piston rod retracted and thus to hold the doors 123—123 closed. When the electronic counter accumulates the proper count, it actuates the solenoid valve and vents the air from the upper portion of cylinder 30 and applies air pressure to the lower portion thereof to extend the piston rod 127. As seen in FIG. 6D, the rod 127 pushes arm 126 up thereby rotating gear 128. Rotation of gear 128 rotates shaft 125a thereby opening the right hand door 123. Gear 128 rotates counterclockwise and thus causes gear 129 to rotate clockwise moving linking rod 130 to the left thereby swinging arm 131 to cause shaft 125b to rotate clockwise opening the left hand door 123. The accumulated stack of bags 31 then drops onto conveyor belt 32 which moves the stacked bags out from under the stacker assembly and delivers them to the packing station. A time delay device in the electronic counter assembly 28 keeps air supplied to the cylinder 30 only long enough to permit the stack of bags 31 to fall from the doors. As soon as the bags 31 clear the doors the time delay device actuates the solenoid to reverse the cylinder 30 and draw piston rod 127 down by applying air pressure to the upper part of the cylinder 30 thus closing the doors 123—123.

A pair of flexible narrow bands 132—132 extend longitudinally across the open top of the bin of the stacker assembly. Each of the bands has one end attached to the upper end brace 95 on the conveyor assembly and the other end attached to an elevator mechanism, designated generally by the numeral 133, which is affixed to the rear end of the rectangular frame 121. The purpose of the flexible bands 132 is to guide the individual bags into the stacker bin as they are discharged from the end of the conveyor-counter assembly 16. As seen in FIG. 6A, when the bags are discharged from the conveyor counter, they are moving at a fairly high speed in an upward direction. The bags strike the bands 132 and are then deflected downwardly into the bin of the stacker assembly as shown in the lower line of arrows. Since it is not feasible to stop and start the conveyor-counter assembly 16 to hold up delivery of individual bags when the stacker assembly is dropping a stack of collected bags, some other provision must be made for preventing single bags from dropping through the open doors when a stack of bags 31 are being dropped onto the conveyor belt.

By elevating the pair of flexible bands 132 to a higher position, the bags or bag, delivered when the doors 123 are open can come in at a higher level, thus requiring a longer period of time to drop to the level in the stacker assembly where the doors 123 are normally positioned when closed. Thus, when the straps 132 are elevated to the position shown in dotted outline in FIG. 6A, the bag is not deflected downward but follows the upper line of arrows as shown in FIG. 6A. The time delay is so arranged that bags received from the conveyor assembly 16 do not drop to the level of the doors 123 until the doors have had time to close again.

The elevator mechanism 133 for raising and lowering the straps 132—132 in conjunction with the opening and closing of the doors may be seen more clearly in FIGS. 6C and 6D. The straps 132—132 are attached to each end of a cross member 134 which is in turn attached to a rod 135 which is slidably retained by a bracket 136 mounted on support frame 121. An L-shaped arm 137 is pivotally mounted on frame 121 and has one end connected to rod 136 and the other end connected to link arm 138 which is in turn connected to gear 129. As seen in FIG. 6C when the doors 123—123 are in the closed position, the elevator mechanism is in its lowered position which causes the bags to deflect directly downward to the stacker hopper. As seen in FIG. 6D when the elevator doors swing open, the gear 129 rotates clockwise causing the L-shaped arm 137 to pivot and raise rod 135, thus elevating the ends of straps 132—132. As seen in FIG. 6A, this permits the individual bags to come in at a higher level and allows the apparatus to drop the stack of bags 31 on the conveyor belt before the individual bag settles down to the level of the doors 123 in their closed position.

A U-shaped support member 139 is slidably mounted on the sides of the rectangular support frame 121 as can be seen in FIG. 6B. A vertically extending stop member 140 is fixedly attached at its upper end to the U-shaped support bracket. This stop member is struck by the forward end of each of the bags 18 as they come into the stacker bin. When the bag strikes the stop 140 it drops down onto the doors 123. The stop 140 and the side boards 122—122 cause the bags to stack uniformly on the doors and to be delivered to the conveyor belt 32 in a superimposed bundle as seen in FIG. 6D.

In an exemplary operation of a counter-stacker apparatus constructed in accordance with the present invention, the bags are received in shingled fashion from the bottomer conveyor belt 19 with about 1½ inches separation between the ends of the bags. The bags are delivered with the flat bottom face down against the conveyor belt. The speed of the reciprocating blade device 23 was set such that the blade 45 moved with a 9-inch stroke and traveled at 117 strokes per minute. The speed of the V-belts in the conveyor-counter assembly 16 was set so that an interval of 2 feet separated each bag passing through the conveyor-counter assembly. The electronic counter mechanism 28 was set to drop a stack containing 25 bags onto the conveyor belt 32. The elevator mechanism 133 was set to raise the flexible bands 132 a total of five inches in order to permit the stack of twenty-five bags to be dropped without single bags dropping through the open doors. Operating in this manner, the counter-stacker apparatus delivered bags at a very high rate to the conveyor belt and then to the packing station where they were banded and packaged by the operator.

While there has been described what is at present considered a preferred embodiment of the present invention, it will be apparent to those skilled in the art that various modifications and changes may be made without departing from the essence of the invention and, particularly, that the invention herein is adapted to various other uses, i.e., counting and stacking flat cardboard blanks. It is intended to cover herein all such modification and changes as come within the true scope and spirit of the following claims.

What is claimed is:

1. An appartaus for separating, counting and stacking flat articles comprising:
   (a) a separator assembly including,
       (i) transport means adapted to support and to move a plurality of said articles arranged in a line in shingle fashion,
       (ii) a reciprocating member adapted to engage the article at the end of said line and to advance said article ahead of the remainder of said articles,
       (iii) drive means for said transport means and said reciprocating members,
   (b) a conveyor-counter assembly including,
       (i) conveyor means adapted to engage said article advanced by said separator means and to convey said article away at a speed sufficient to separate said article completely from the next adjacent article,
       (ii) counting means having an element adapted to be actuated by passage of each article through said conveyor means,
       (iii) drive means for said conveyor means; and
   (c) a stacker assembly including,
       (i) hopper means adapted to receive said articles individually from said conveyor-counter assemby and to stack said articles in superimposed fashion,
       (ii) movable support means at the bottom of said hopper means supporting said stack of articles,
       (iii) means actuated by said counting means to open and close said support means to drop said stack of articles when a predetermined number have been accumulated.

2. An apparatus for separating, counting and stacking flat articles comprising:
   (a) a separator assembly including,
       (i) transport means adapted to support and to move a plurality of said articles arranged in a line in shingle fashion,
       (ii) a reciprocating member adapted to engage the article at the end of said line and to advance said article ahead of the remainder of said articles,
       (iii) hold down means on said separator assembly adapted to restrain the articles immediately behind said end article from movement when said reciprocating member advance said end articles,
       (iv) drive means for said transport means and said reciprocating member;
   (b) a conveyor-counter assembly including, (i) conveyor means adapted to engage said article advanced by said separator means and to convey said article away at a speed sufficient to separate said article completely from the next adjacent article,
(ii) counting means having an element adapted to be actuated by passage of each article through said conveyor means,
(iii) drive means for said conveyor means; and
(c) a stacker assembly including,
(i) hopper means adapted to receive said articles individually from said conveyor-counter assembly and to stack said articles in superimposed fashion,
(ii) movable support means at the bottom of said hopper means supporting said stack of articles,
(iii) means actuated by said counting means to open and close said support means to drop said stack of articles when a predetermined number have been accumulated.

3. An apparatus for separating, counting and stacking flat articles comprising:
(a) a separator assembly including,
(i) transport means adapted to support and to move a plurality of said articles arranged in a line in shingle fashion,
(ii) separator means adapted to engage the article at the end of said line and to advance said article ahead of the remainder of said articles,
(iii) drive means for said transport and separator means;
(b) a conveyor-counter assembly including,
(i) conveyor means adapted to engage said article advanced by said separator means and to convey said article away at a speed sufficient to separate said article completely from the next adjacent article,
(ii) counting means having an element adapted to be actuated by passage of each article through said conveyor means,
(iii) drive means for said conveyor means; and
(c) a stacker assembly including,
(i) hopper means adapted to receive said articles individually from said conveyor-counter assembly and to stack said articles in superimposed fashion,
(ii) deflector means across the top of said hopper means adapted to guide said articles downwardly into said hoppers,
(iii) movable support means at the bottom of said hopper means supporting said stack of articles,
(iv) means actuated by said counting means to open and close said support means to drop said stack of articles when a predetermined number have been accumulated,
(v) deflector elevator means connected to said means to open said support means whereby said deflector means is raised to permit said articles to be delivered substantially horizontally to said hopper means when said support means is open.

4. An apparatus for separating, counting and stacking flat bags comprising:
(a) a first endless belt conveyor mechanism adapted to move a plurality of flat bags stacked in line in shingled fashion,
(b) power means for said first conveyor mechanism,
(c) a reciprocating blade device adapted to engage the endmost flat bag and to move it forwardly from the remainder of said flat bags,
(d) a hold-down assembly mounted on said conveyor mechanism to grip those flat bags overlying said endmost flat article,
(e) power means for said reciprocating blade device,
(f) a second endless belt conveyor mechanism positioned adjacent the delivery end of said first conveyor to receive and convey individually said flat bags advanced by said blade device,
(g) a counting mechanism having a portion thereof positioned to be actuated by individual flat bags moving through said second conveyor,
(h) an accumulator bin adjacent the delivery end of said second conveyor to collect said flat bags into a superimposed stack,
(i) door means on the bottom of said bin adapted to be opened to drop said stack of flat bags,
(j) opening means for said door means actuated by said counter mechanism when a predetermined number of bags have been collected in said accumulator bin.

5. The apparatus of claim 4 wherein said hold-down assembly includes a pair of axially aligned rollers through which said line of flat articles pass.

6. The apparatus of claim 4 wherein a pair of pressure fingers are provided adjacent the delivery end of said first conveyor.

7. The apparatus of claim 4 wherein said second endless belt conveyor includes a plurality of aligned sets of upper and lower individual endless belts.

References Cited
UNITED STATES PATENTS 3,205,794   9/1965   Califano ______________ 93—93

RICHARD E. AEGERTER, *Primary Examiner.*